May 12, 1959

B. VER NOOY 2,886,068

PIPE LINE PLUGGER

Filed July 30, 1957

BURTON VER NOOY
INVENTOR

BY Browning, Simms & Hyer

ATTORNEYS

May 12, 1959  B. VER NOOY  2,886,068
PIPE LINE PLUGGER

Filed July 30, 1957  2 Sheets-Sheet 2

BURTON VER NOOY
INVENTOR

BY Browning, Simms & Hyer

ATTORNEYS

United States Patent Office 2,886,068
Patented May 12, 1959

2,886,068

PIPE LINE PLUGGER

Burton Ver Nooy, Tulsa, Okla., assignor to T. D. Williamson, Inc., Tulsa, Okla.

Application July 30, 1957, Serial No. 675,188

8 Claims. (Cl. 138—94)

This invention relates to a pipe line plugger of the type having a plugging member insertable into a pipe line through a lateral opening in the pipe line.

Maintenance of pipe lines often make it necessary to isolate a portion of a line upon which repair, replacement or alterations are made. Should a section of pipe line become ruptured it is obviously desirable to isolate the ruptured section from its communication with adjacent portions of the line. With the ruptured section isolated, it may be drained for repairs while the remainder of the line remains full of liquid.

Prior pipe line plugging mechanisms have been relatively complex, expensive to manufacture and costly to transport while subject to failure at high pressures. Prior pluggers often employed a carrier structure with an expandable valve means on their end, the latter being insertable into the pipe line by way of a lateral opening and subsequently expanded to form a plug. The expandable valve means has frequently comprised a rubber boot or strip having an internal mechanism for expanding the boot or strip into sealing engagement with the walls of the pipe line. Obviously, two separate mechanisms have been required, one for moving the valve into the pipe line and another for expanding the valve means after it has been moved into the line. The prior requirement of structure for each of these functions has resulted in an unduly complicated mechanism which is difficult to design with sufficient strength to withstand high pressures. This design problem is particularly troublesome in connection with the larger sizes of plugger, e.g. for pipe lines six inches and over in size.

Additionally, the prior valve means with internal expanding mechanism has required that the pipe line at the point where the plug formed be substantially in round and free from any substantial internal irregularities in contour in order to form a fluid tight seal. This requirement is fundamental where the expanding mechanism for the boot or seal strip is comprised of expandable metal elements presenting a circular outer periphery to press the boot or strip against the inner wall of the pipe. Therefore, the maximum permissible irregularity in pipe contour is small in order to achieve an efficient seal.

These prior plugging machines have also been constructed to make it necessary to provide a seal between the valve means forming the plugging element and the pipe line and a seal between the plugging element and the plugger housing from which the plugging element was interposed into the pipe line. This necessity has been brought about by the fact that these prior art plugging elements had been inserted into lateral openings in the pipe line immediately and axially adjacent the plugger housing. The result is that the plugging element seals with the interior of the pipe line only around a portion of the line's periphery, the remainder of the plugging element being exposed in the lateral opening of the pipe line so that fluid could flow therepast were the seal between the housing and plugging not provided. Obviously, this plurality of seals further complicates the structure and renders it more vulnerable to leaking.

It is an object of the invention to provide a pipe line plugger which is relatively simple in construction and positive in operation and which employs a plugging element or member adapted to be inserted through a lateral opening in the pipe line by one manual manipulation and then moved along the pipe line into sealing position at one side of the lateral opening by a second manual manipulation.

Another object of the invention is to provide a pipe line plugger in which a plug element or member is linked to a carrier means in such manner that actuation of structure mounted on the carrier means, after the plug element has been moved through a lateral opening in the pipe line, advances the plug element along the pipe line to a position at one side of the lateral opening where it extends transversely across the pipe line to form a peripheral seal therewith.

Another object of the invention is to provide a pipe line plugger in which a plug element is linked to a carrier, as by an expanding linkage, in such manner that upon actuating the linkage through an element mounted in the carrier, the plugging element will be advanced along the line to a final plugging position situated at one side of the lateral opening, the linkage between the plug element and the carrier means then serving to retain the plugging element in plugging position despite relatively high fluid pressures applied thereto.

Another object of the invention is to provide a pipe line plugger in which a plug element can be advanced and properly positioned in a pipe line by merely rotating a single shaft to expand the linkage connected to the plug element after the plug element has been introduced into the pipe line transversely through a hole therethrough.

Other objects, advantages and features of this invention will be apparent to one skilled in the art upon the consideration of the written specification, appended claims and attached drawings, wherein:

Figure 1:
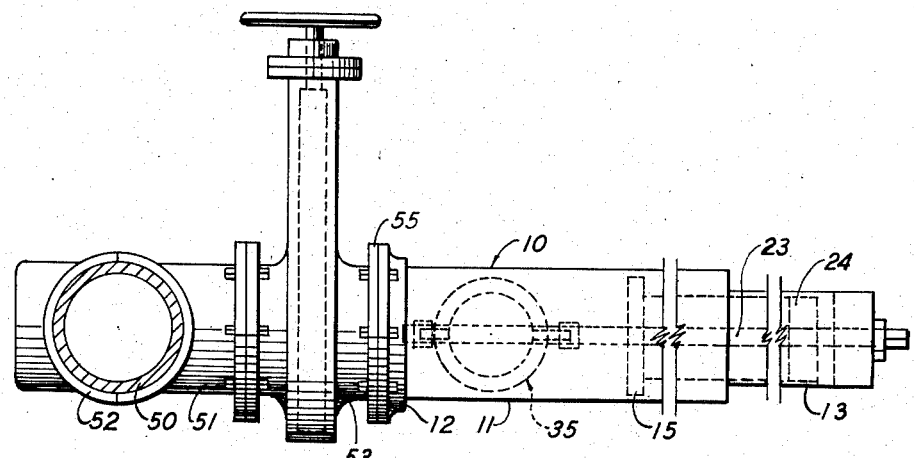
Fig. 1 is a schematic view of an embodiment of the apparatus of this invention installed upon a pipe line, the view being taken at right angles to the pipe line.

The pipe line plugger of this invention includes generally a plug element or member linked to, and carried by, a carrier structure which itself is axially movable within a plugger housing. The carrier structure is advanced transversely into an opening in the pipe line, from a housing, and the plug member is then advanced sidewise along the length of the pipe until it is seated at one side of the lateral opening. When seated, the plug member is situated to extend transversely of the pipe line and prevent fluid flow along the pipe line past the plug member.

With the plug member situated at one side of the lateral opening and in a portion of the pipe line having a continuous periphery, it is possible for the plug member to form a seal with the inside walls of the pipe line around its entire periphery. The complete plug assembly is to be considered in its rigid portions and its flexible seal member carried thereon. As an assembly, it is sized slightly larger than the inside diameter of the pipe line with the rigid body portion extending across the major portion of the cross-section of the pipe line. Provision of the body portion across the major portion of the cross-section of the pipe line enables the plug member to be made very strong to resist high pipe line pressures.

One form of the flexible seal portion of the plug is given a lip shape to be employed as peripheral sealing means around the solid body portion. This flexible seal member is flexed to some degree as the plug member is moved into the pipe line, forming a seal with this function which is independent of any force originating from the fluid pressure within the pipe line. However, the seal is rendered progressively more efficient by energization from the force of the fluid pressure within the pipe line acting on the lip of the seal in pressing it more firmly against the inside wall of the pipe.

The carrier part can be advanced and retracted by a suitable arrangement which will preferably not rotate the plug member. A plug member and mechanism which advances the plug into plugging position, mounted on the carrier part are landed in the bottom of the housing about the pipe opening. Thereafter, rotating a shaft of the advancing structure for the plug will move it into operative position within the pipe line. By providing a fluid tight housing around the plug member and carrier part, which housing is open only to pipe line pressure, and a seal between the shaft and housing, the parts within the housing, that is, the carrier part and plug member can be exposed on all sides to the fluid pressure of the pipe line. As a result of this arrangement, a pipe line fluid exerts substantially no force on the plug member or carrier part tending to resist their advancement toward or away from the pipe line and it is relatively easy to advance and retract the carrier part and plug member. While the pipe line fluid does act across the effective cross-section of the shaft of the carrier, urging it in a direction away from the pipe line, that is to urge the shaft from the housing, such urging is relatively inconsequential since the shaft has a relatively small cross-section, resulting in a relatively small force.

Referring now to the drawings, a housing for the plugger has been provided, designated generally by the numeral 10, including a tubular part 11 having a flange 12 on one end with which the housing is bolted to a branch of a pipe line or to a valve mounted on the pipe line. Of course, the housing could be threaded to the pipe line or valve. The end of the housing adjacent the flange 12 is open and the other end is closed by an annular ring 11a which carries an extension 13. Within this housing is mounted a carrier means for advancing and retracting the plug member.

The structure illustrated in these drawings for advancing and retracting the carrier means for the plug member may take various forms. The particular form illustrated here is to be taken as only representative of the various possible forms. In general, the structure which advances and retracts the carrier means, landing the plugger structure within the pipe line, does so without rotating the carrier part.

The carrier includes a circular plate 15. Slide and guide means are illustrated for preventing relative rotation between plate 15 and housing 10, thereby permitting indexing the carrier part with respect to the pipe line while retracted and then advancing such part without changing its rotative position relative to the pipe line. A slide and guide means include elongated tubular member 17 having keyways 18 and 18a therein which are engaged by keys 19 and 19a carried upon an annular keying ring 20. Keying ring 20 is illustrated as rigidly secured to ring 11a by bolts 21. With this construction, it will be apparent that the carrier plate 15 is moved axially through housing 10 and maintained against relative rotation with respect to the housing by engagement of keys 19 and 19a and keyways 18 and 18a, respectively.

The structure for advancing and retracting carrier plate 15 within housing 10 includes a rotatable shaft 22 carried by the housing and fixed against endwise movement relative to the housing. Shaft 22 has an elongated threaded portion 23 engaging jack screw nut 24 carried by tubular part 17. The length of threaded portion 23 is sufficient that plate 15 can be advanced out of housing 10 a desired distance, that is, a distance sufficient to suitably land the plug structure carried by plate 15 in the pipe line. Also, tubular part 17 must be of sufficient length to receive threaded portion 23 extending below nut 24 when carrier plate 15 is retracted to its position most remote from the pipe line.

Shaft 22 is fixed against endwise movement relative to housing 10. The structure illustrated for this provision is shown as including an annular shoulder 22a situated between thrust bearings 25 and 26. The bearings are carried by stuffing box 27 threaded to housing extension 13, and are retained in place by bearing retainer ring 28 connected to the stuffing box as by bolts 29. The outer end of the stuffing box is provided with an annular recess 30 into which a packing 31, preferably chevron packing or the like, can be disposed to provide a seal between shaft 22 and stuffing box 27. A suitable packing gland 32 can be threaded into the stuffing box to tighten the packing. Additionally, a seal, such as O-ring 33, can be provided between the stuffing box 27 and housing extension 13 to prevent escape of fluid.

The operation of the disclosed structure is fairly apparent. Shaft 22 can be rotated to cause nut 24 to travel along threaded portion 23 of the shaft with corresponding axial movement of carrier plate 15. Endwise move of shaft 22 is prevented by retaining shoulder 22a between bearings 25 and 26. At the same time, the rotation of tubular part 17 is prevented by the key and keyway structure described. The result is that a single manipulative motion, namely the rotation of shaft 22, can advance and retract carrier plate 15 within housing 10.

A plug member or element, designated generally by the numeral 35, is provided to be insertable into the pipe line to form a plug therein. This plug element is preferably circular in contour and, as an assembly, has a diameter slightly larger than the inside diameter of the pipe line. The portion of the assembly which renders it specifically larger than the pipe line diameter is a peripheral seal adapted to abut and be mechanically compressed in forming an initial mechanical seal with the inner walls of the pipe line. The solid body portion of the member 35 includes a flange 36 and nose assembly 37 for backing up the peripheral seal member which is in the form of a cup 38 disposed therebetween. The nose assembly illustrated is a single piece through which studs 39 and 40 extend through both cup 38 and flange 36 into ear 41. Studs 39 and 40 thus bring together the entire plug assembly 35 into a unit adapted to be inserted into plugging position within the pipe line.

A cross-section taken of the seal cup illustrates this preferred embodiment as being of the lip type, with the lip extending in the direction from which fluid pressure is applied to the plug member. This construction permits the internal cross-section of the line to be irregular, such as out-of-round, scored, rough, etc., and yet effectively sealed by the lip type cup. As indicated supra, the diameter of the seal cup, relative to the inside plate diameter, provides for an initial mechanical seal upon insertion of the plug assembly into the pipe line. This initial mechanical seal is then supplemented by energization from the fluid pressure within the pipe line acting on the lips of the seal to give a cumulative efficiency of sealing function between the plug assembly and the pipe wall.

The present invention provides for a connection between the carrier plate 15 and the plug assembly 35 which can be actuated to move the plane of the circular plug assembly 35 transversely of the housing axis by a single manipulated element. Specifically, shaft 100 is provided as the single manipulated element between carrier plate 15 and plug assembly 35. Rotation of shaft 100 in one direction will cause movement of plug assembly 35 into plugging position. Opposite rotation of the shaft will extract the plug assembly 35 from the pipe line so that it can be retracted to a position axially adjacent shaft 100. Rotation of shaft 22 will then retract carrier plate 15, shaft 100 and plug assembly 35, from their landed position, into the housing.

Shaft 100 is provided with two sets of threads. Right-hand threads are formed at 101 while left-hand threads are formed at 102. Linkage followers 103 and 104, when carried on the threaded portions, will retreat from each other when shaft 100 is rotated clockwise and advance toward each other when the shaft is rotated counterclockwise.

A certain degree of friction exists between the threads of 101 and 102 on shaft 100 and followers 103 and 104. Rotation of shaft 100 would not, without some means of overcoming this friction, automatically result in the threads moving the followers axially of the shaft 100. Therefore, shaft 100a is fixed by one of its ends to carrier plate 15 at 100b and accommodated in holes in followers 103 and 104 with a sliding fit. The other, lower, end is landed in a socket structure at 100c. Shaft 100a is, therefore, held in a rigid, vertical, position to resist and overcome the frictional forces between followers 103 and 104 and shaft 100, and to cause their approach and retreat toward and away from each other dependent upon which direction shaft 100 is rotated.

As linkage arms 105 and 106 extend between followers 103 and 104 and ear 41, rotation of shaft 100 results in plug assembly 35 traveling along a line transverse to that of the housing. This arrangement of linkage may be descriptively termed as "scissor" linkage in its function with respect to shaft 100 and plug assembly 35. Regardless of the descriptive title given the linkage, the arrangement effectively moves the plug assembly 35 into position within the pipe line in which it is landed. The linkage of this type is inherently sturdy and positions the plug assembly very positively into its plugging position.

Figure 2:
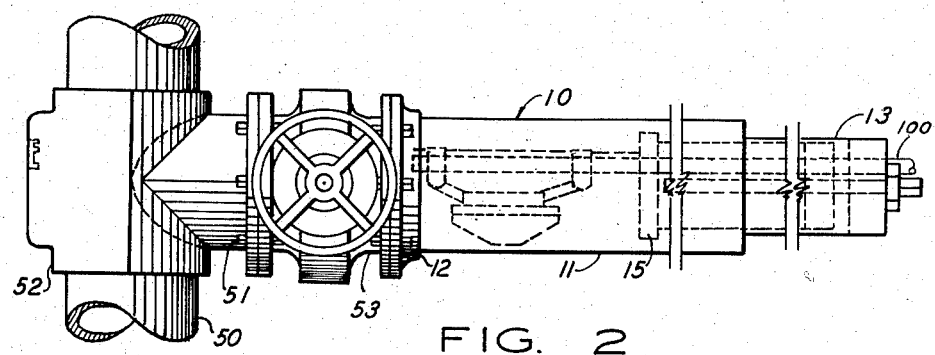
Fig. 2 is a view taken at right angles to that of Fig. 1 and shows the plug element retracted into the plugging housing.
Figure 3:
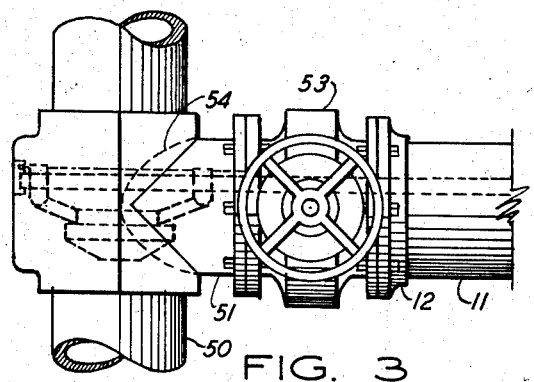
Fig. 3 is a view similar to Fig. 2 but with the plug element having been laterally introduced preparatory to being advanced into plugging position into the pipe line.

In a more general analysis of the operation of the apparatus, Figs. 1 through 3 illustrate pipe line 50 provided with a T branch 51 and saddle 52. A cross T would also provide space below the pipe line 50 for mounting the socket structure in which to land the plugger. In the drawings, the saddle 52, including the T branch 51, is welded to the pipe line and a suitable gate valve 53 connected to the T branch. A tapping machine, of a type well known to those skilled in the art, can then be mounted on the valve and the tapping machine operated to cut an opening 54 through the walls of pipe line 50.

Figure 4:
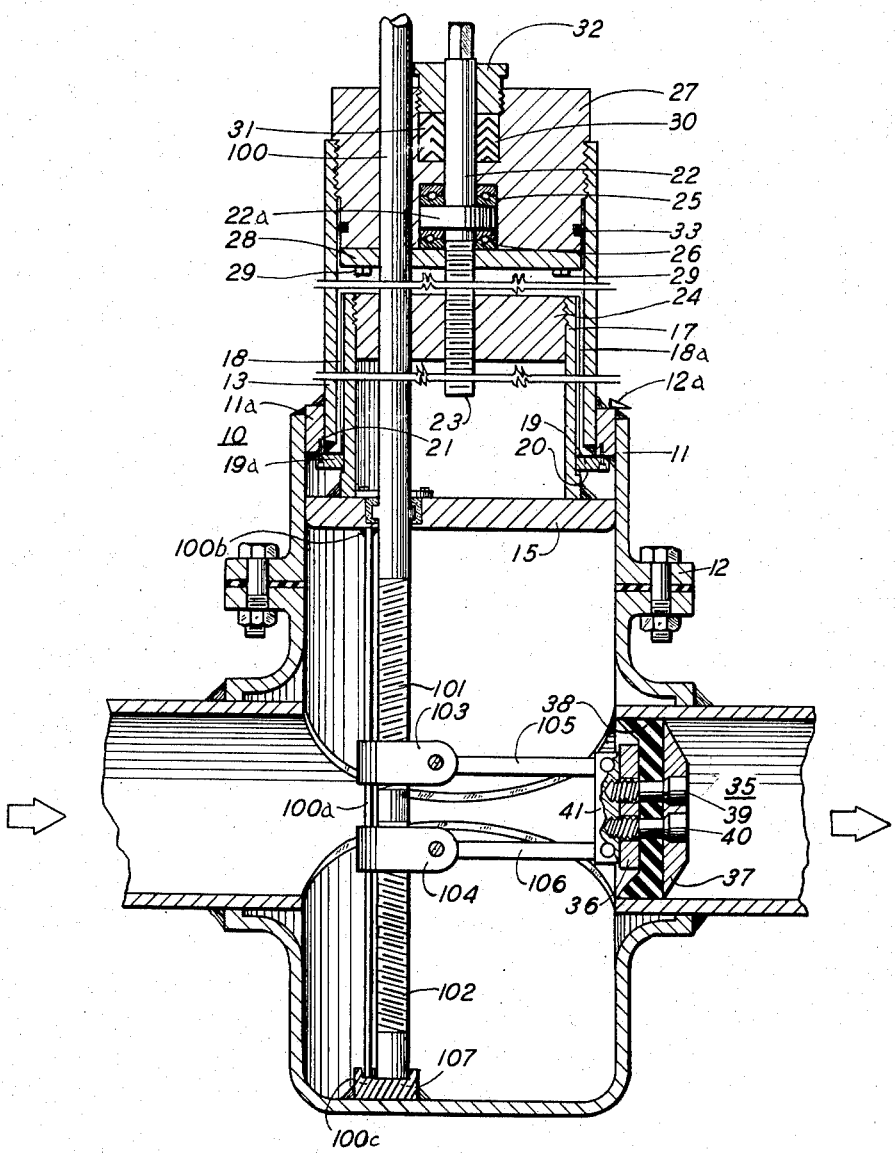
Fig. 4 is the embodiment of Figs. 1–3 shown in a cross-section elevation with the plugging element advanced into plugging position.

The opening 54, viewed through valve 53, should have a diameter substantially equal to the inside diameter of T branch 51. In other words, the opening will correspond to the projection of a circle upon the pipe line and will extend across about 180° of the pipe line's circumference. Upon cutting of the opening, removal of the tapping machine and closing of valve 53, the apparatus of this invention can be mounted on the valve as shown in Figs. 1 to 3. In mounting the apparatus of this invention on valve 53, a bolt-on flange 12 can be connected to housing 10 and bolted to the valve 53 or any other suitable connection can be made. An index such as arrow 12a (Fig. 4) can be employed to secure proper rotational alignment of the plugger with respect to the pipe line. The valve can then be opened and shaft 22 rotated to move the plug member from its Fig. 2 position to its landed position in the pipe line. Specifically, the end of shaft 100 will be landed in a receptacle structure 107 provided in the bottom of saddle 52. Then, rotation of shaft 100 will bring followers 103 and 104 toward each other and move plug assembly 35 into position as shown in Fig. 4.

Any fluid flow through the pipe line will also aid in moving the plug member into seated position. Fluid pressure applied in the direction of the arrow in Fig. 4 will urge the lips of seal 38 outwardly into sealing engagement of the inner walls of the pipe line while arms 105 and 106 will prevent the plug from being displaced downstream by the fluid. Due to the landing of shaft 100 in its socket 107, large forces exerted by the pipe line fluid on plug assembly 35 will be adequately resisted without appreciable transverse flexure of rod 100.

When it is desired to retract the plug member from the pipe line, shaft 100 can be rotated to retract plug assembly 35 from sealing engagement with the pipe line and into the position illustrated in Fig. 3. Subsequently, shaft 22 can be rotated to retract carrier plate 15 and withdraw the entire plugging assembly from its landed position as shown in Fig. 2. Valve 23 can then be closed and the plugging apparatus removed from the pipe line, if desired. The invention thus provides a very sturdy connection between plug and carrier which can be separately, and manually, operated to very positively position the plug into operative position.

From the foregoing it can be seen that this invention is one well adapted to attain all the ends and objects hereinabove set forth, together with other advantages which are obvious and which are inherent to the structure.

It will be understood that certain features and sub-combinations are of utility and may be employed without reference to other features and said combinations. This is contemplated by and is within the scope of the claims.

As many possible embodiments may be made in the invention without departing from the scope thereof, it is to be understood that all matter herein set forth or shown in the accompanying drawings is to be interpreted as illustrative and not in a limiting sense.

The invention having been described, what is claimed is:

1. A pipe line plugger of the type having a plug member insertable into a line through an opening in the line comprising, a housing mounted on the line and surrounding the line opening and having its central axis extending laterally with respect to the line, a rod sealingly extending into the housing parallel to the housing axis, a right-hand thread portion formed on the rod portion within the housing, a left-hand thread portion formed adjacent to the right-hand portion, a follower member mounted on each of the right-hand and left-hand thread portions of the rod, a plug member, and a link pivoted from each follower member from one end and from the plug at its other end, whereby rotation of the rod will cause the followers to reciprocate toward and away from each other with resulting positioning of the plug laterally with respect to the housing axis in order that the plug be placed into operative plugging position.

2. The plugger of claim 1 wherein a resilient seal structure is arranged peripherally on the plug and having a shape with which to form a mechanical seal with the line wall which is increased in efficiency by fluid pressure from within the pipe acting thereon.

3. The plugger of claim 2 including, a structure mounted with fixed relation to the pipe and providing a socket to receive the bottom end of the rod mounted on the carrier when the rod lands in relation to the pipe in order to form an anchor point against lateral movement of the rod.

4. The plugger of claim 3 wherein the rod is mounted on carrier structure arranged to reciprocate axially within the housing, the rod mounted off-center the housing axis a sufficient distance that the plug in its retracted position will form an assembly with the carrier which can be landed in relation to the pipe from the housing with a diameter substantially that of the pipe line plug.

5. A pipe line plugger which comprises, in combination, a housing, a circular plug member having a peripheral seal adapted to sealingly engage the inner walls of the pipe line and having a diameter lying parallel to the housing axis, a pair of scissor linkage arms of substantially equal length, the arms being pivotally connected to the plug member by one end at points spaced along said plug diameter, a rotatable shaft extending into the housing and arranged parallel to the housing axis, adjacent right and left-hand threaded portions formed on the shaft extending into the housing, follower members mounted on the threaded portions formed on the shaft with each follower pivotally connected to an arm end opposite the end pivoted to the plug member to thereby form expanding linkage which will maintain said diameter of the plug member substantially parallel to the axis of the housing upon rotation of the shaft, the rotation reciprocating the followers along the shaft axis and the plug member laterally of the housing axis into plugging position.

6. The plugger of claim 5 including, a socket structure mounted fixedly with respect to the housing to receive the bottom end of the shaft extending into the housing in order to form an anchor point for the shaft to keep it from being bent in a lateral direction as it is rotated to position the plug laterally into plugging position.

7. A pipe line plugger which comprises, in combination, a housing adapted to be mounted on a pipe line to extend laterally thereof and to surround a lateral opening in the wall of the pipe line, carrier means mounted on the housing in such a way as to be axially moved with respect to the housing, a plug member within the housing and of such size as to be movable from said housing through said opening into the pipe line and having a peripheral seal engageable with the inner walls of said pipe line, a shaft rotatably mounted on the carrier means extending parallel to the housing axis and having adjacent left and right-hand threads formed thereon below the carrier means, a follower member on each of the right and left-hand thread portions formed on the shaft, connecting linkage between said rotatable shaft and said plug member including arms which are each pivotally connected to the follower members and to said plug member to force the latter, upon rotation of the shaft mounted on the carrier means, to move laterally away from the rotatable shaft of the pipe line to a position across the interior of the pipe line at one side of the opening and, upon rotation of the shaft in the other direction, to be retracted along the pipe line into alignment with said opening and thence to be withdrawn into said housing.

8. A pipe plugger of the type having a plug member insertable into the pipe through an opening in a side wall of the pipe comprising, a housing mountable on the pipe to surround the pipe opening, a rotatable rod in the housing, means connected to the rod for moving one end of the rod into and out of the housing, plug means adapted when seated in the pipe to one side of the pipe opening to form a sealed fluid barrier across the pipe and when retracted to be movable into said housing, a pair of followers, means connecting the followers to the rod adjacent said one end thereof such that upon rotating of the rod, the followers move toward and away from each other, and linkage means connecting between the followers and the plug means and operable upon relative movement of the followers to move the plug means toward and away from the rod between seated and retracted positions.

References Cited in the file of this patent
UNITED STATES PATENTS
1,966,819    Irvin _____ July 17, 1934